United States Patent [19]

Fernholz et al.

[11] 3,934,045

[45] Jan. 20, 1976

[54] PROCESS FOR PRESERVING BREAD AND BAKERY PRODUCTS WITH SORBIC ACID

[75] Inventors: Hans Fernholz, Fischbach, Taunus; Hermann Neu, Neu-Isenburg, both of Germany

[73] Assignee: Hoechst Aktiengesellschaft, Frankfurt am Main, Germany

[22] Filed: June 27, 1974

[21] Appl. No.: 483,677

[30] Foreign Application Priority Data

June 29, 1973 Germany.............................. 2333142

[52] U.S. Cl. ................. 426/331; 426/335; 424/317
[51] Int. Cl.² ........................................... A21D 2/14
[58] Field of Search ............ 426/335, 331, 323, 326

[56] References Cited
UNITED STATES PATENTS

| | | | |
|---|---|---|---|
| 2,474,227 | 6/1949 | Coleman et al.................. | 426/335 X |
| 2,858,225 | 10/1958 | Gooding et al. ................ | 426/316 X |
| 3,510,317 | 5/1970 | Fernholz............................ | 426/335 |

*Primary Examiner*—Raymond N. Jones
*Attorney, Agent, or Firm*—Curtis, Morris & Safford

[57] ABSTRACT

Process for preserving bread and bakery products with sorbic acid by adding to the dough before baking a coarsely crystalline sorbic acid.

5 Claims, No Drawings

PROCESS FOR PRESERVING BREAD AND BAKERY PRODUCTS WITH SORBIC ACID

It is known that the preservation of bread and other bakery products by the addition of sorbic acid to the dough is problematical if yeast and leaven are used for rendering the dough spongy. It is because the sorbic acid not only inhibits the formation of mould, but also impairs the efficiency of the yeast, so as to retard the fermentation of the dough and thus reduce the quality of the bread or pastry. Almost the same applies to other mould-preventing agents such as propionic acid. The retardation of the fermentation can be compensated to a limited extent only by longer fermentation times or by increasing the amounts of yeast and leaven. These measures also meet with technical difficulties especially in continuous large-scale plants. When addition of sorbic acid is reduced to an amount at which the retardation of the fermentation can be tolerated, an adequate protection is no longer ensured.

In order to avoid the fermentation-impeding action of the sorbic acid, two different ways have been entered previously. One way consists in coating the sorbic acid crystals with an agent, insoluble in water and physiologically harmless, as for example glycerine monostearate, whereby the solubility of the sorbic acid in the dough is reduced to such a degree that no notable retardation of the fermentation takes place. Processes of this kind have not been successful in practice until now, apparently owing to the fact that the amount of sorbic acid relieved in the baking process is insufficient or that the distribution of sorbic acid is unsatisfactory. The other way consists in adding to the dough sorbic acid in the form of an antimicrobially inefficient mixed anhydride with a fatty acid, such as palmitic acid. The anhydride is then hydrolysed in the baking process to sorbic acid and fatty acid, such as palmitic acid. The aforesaid process has particular advantages in practice, but the disadvantage that the sorbic acid-fatty acid anhydride is more expensive than the free sorbic acid. Almost the same is true for the use of mixed anhydrides of propionic acid, such as propionic-palmitic anhydrides.

It has now surprisingly been found that the fermentation impeding action of sorbic acid can be avoided by adding to the dough a sorbic acid in the form of its coarse crystals substantially having a particle size of more than 100 $\mu$m and that on the other hand the best mould preventing action is obtained by adding to the dough a sorbic acid having a particle size of less than 1000 $\mu$m. It could not been expected that the slightly soluble sorbic acid added to the dough in the form of coarse crystals distributes so uniformly in the baking process that an adequate preservation of the whole bread is ensured.

The present invention therefore provides a process for preserving bread and pastry with sorbic acid wherein a coarsely crystalline sorbic acid having a granular size of from 100 to 1000 $\mu$m, preferably of from 200 to 800 $\mu$m, is added to the dough before baking.

The coarsely crystalline sorbic acid to be used according to the invention may be prepared by controlled fractional crystallization, for example from concentrated aqueous sodium acetate solutions or by crystallization followed by fractionation, for example by filtering or by means of an air separator.

The sorbic acid generally is directly added to the dough, whereby care must be taken that a good distribution is ensured. Of course, the sorbic acid can also be previously mixed with the flour.

The sorbic acid generally is added in an amount exceeding 0.1% by weight, calculated on the quantity of the flour. The upper limit of the amount essentially depends on the kind of the pastry.

In order to ensure an adequate protection against mould, generally additions of from 0.1 to 0.3% by weight, calculated on the quantity of the flour, are advantageous.

The process according to the invention has the advantage that the coarsely crystalline sorbic acid has an excellent mould preventing action without negatively influencing the fermentation, yield or properties of the dough or the fermentation time. The finished bakery product or bread has exactly the same properties, such as brownness, crumb or nature of pores as comparable products made without the addition of sorbic acid. Odour and taste are not affected by the addition of sorbic acid.

The following examples illustrate the invention.

EXAMPLE 1: (fermentation of the dough)

Composition of the dough: 70 g of flour, 1.1 g of common salt, 0.4 g of sugar, 4.0 g of yeast and 30 ml of water.

Test conditions: kneading time: 5 minutes, fermentation time: 60 minutes, temperature: 30°C.

Sorbic acid having a different particle size was added to the aforesaid dough in an amount of 0.16% by weight calculated on the quantity of the flour. The volume of carbon dioxide evolved in the fermentation process was determined in usual manner. The following results were obtained:

| | particle size of the sorbic acid | without an addition of sorbic acid ml $CO_2$ | with an addition of 0.16% of sorbic acid ml $CO_2$ |
|---|---|---|---|
| 1. | > 500 $\mu$m | 297 | 286 |
| | | 332 | 324 |
| 2. | 200–500 $\mu$m | 345 | 328 |
| | | 331 | 311 |
| 3. | 10–100 $\mu$m | 319 | 177 |
| | | 335 | 189 |

EXAMPLE 2: (preserving effect)

A wheat dough to which 0.18% by weight of coarsely crystalline sorbic acid, calculated on the quantity of the dough (particle size from 250 to 650 $\mu$m), had been added was baked in brick-shaped loaves (fermentation time: 60 min., time of baking: 60 min., oven temperature: 180°C). The external features, such as color, crumb and crusts, pore size, elasticity and bread volume were the same as those of the comparison bread which had been baked without an addition of sorbic acid. The finished bread was sliced. One part of the slices was stored in an incubator (30°C, relative air moisture of from 95 to 100%), another part was stored at room temperature in polyethylene bags, and a third part was exposed to an atmosphere strongly infected with mould in order to get infected.

results:

a. storage in an incubator: a beginning formation of mould on the comparison sample after 2 days, on the slices of bread containing sorbic acid still no visible formation of mould after 47 days.

b. storage in polyethylene bags: a beginning formation of mould on the comparison sample after 4 days, on the slices of bread containing sorbic acid no visible formation of mould after 47 days.

c. storage in an infection chamber: a beginning formation of mould on the comparison sample after 1 day, on the slices of bread containing sorbic acid after 31 days a beginning formation of mould.

What we claimed is:

1. A process for preserving bread and bakery products made from flour containing dough which comprises incorporating in said dough at least about 0.1% of crystalline sorbic acid of particle size ranging from about 100 to about 1000 μm, said percent being by weight of flour in said dough, and baking said dough to make bread or a bakery product.

2. A process according to claim 1 wherein said particle size is from about 200 to about 800 μm.

3. A process according to claim 1 wherein from about 0.1% to about 0.3% of sorbic acid is used.

4. A process according to claim 1 wherein said sorbic acid is incorporated in said dough by blending it into said dough.

5. A process according to claim 1 wherein said sorbic acid is incorporated in said dough by blending it with said flour prior to making said flour into said dough.

* * * * *